(12) United States Patent
Clemen, Jr. et al.

(10) Patent No.: US 9,359,081 B2
(45) Date of Patent: Jun. 7, 2016

(54) ICING CONDITION DETECTION SYSTEM

(75) Inventors: Mark Joseph Clemen, Jr., Bremerton, WA (US); Jerry Lee Wert, Federal Way, WA (US); George Albert Perry, Federal Way, WA (US); Scott Hutchinson Gardner, Issaquah, WA (US); Erik Marc Langhofer, Seattle, WA (US); Charles Steven Meis, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 817 days.

(21) Appl. No.: 13/494,550

(22) Filed: Jun. 12, 2012

(65) Prior Publication Data

US 2013/0327756 A1 Dec. 12, 2013

(51) Int. Cl.
*B60L 1/02* (2006.01)
*B64D 15/20* (2006.01)

(52) U.S. Cl.
CPC ..................................... *B64D 15/20* (2013.01)

(58) Field of Classification Search
CPC ............................ B60H 1/2225; B60H 1/2218
USPC ....... 244/134 F, 134 R, 134 D, 134 B, 134 C; 219/202; 364/424
See application file for complete search history.

(56) References Cited

U.S. PATENT DOCUMENTS

| | | | |
|---|---|---|---|
| 4,732,351 A | * | 3/1988 | Bird .......................... 244/134 D |
| 5,206,806 A | * | 4/1993 | Gerardi et al. ................ 340/582 |
| 5,474,261 A | * | 12/1995 | Stolarczyk et al. ........ 244/134 F |
| 2008/0118661 A1 | * | 5/2008 | Watanabe et al. ............. 427/576 |
| 2009/0149997 A1 | * | 6/2009 | Stothers ....................... 700/275 |

OTHER PUBLICATIONS

Saikia et al., "Raindrop size distribution profiling by laser distrometer and rain attenuation of centimeter radio waves", Indian Journal of Radio & Space Physics, vol. 38, Apr. 2009, pp. 80-85.
Sassen et al., "Scattering of Polarized Laser Light by Water Droplet, Mixed-Phase and Ice Crystal Clouds. Part I: Angular Scattering Patterns", Journal of the Atmospheric Sciences, vol. 36, May 1979, pp. 838-851.
Janzen et al., "Analysis of small droplets with a new detector for liquid chromatography based on laser-induced breakdown spectroscopy", Spectrochimica Acta Part B, vol. 60, Nos. 7-8, Aug. 2005, pp. 993-1001.
Lonhert et al., "Profiling Cloud Liquid Water by Combining Active and Passive Microwave Measurements with Cloud Model Statistics", Journal of Atmospheric and Oceanic Technology, vol. 18, Aug. 2001, pp. 1354-1366.
"Quartz crystal microbalance", Wikipedia, accessed Jun. 12, 2012, 17 pages http://en.wikipedia.org/wiki/Quartz_crystal_microbalance.

* cited by examiner

*Primary Examiner* — Phuong Nguyen
(74) *Attorney, Agent, or Firm* — Yee & Associates, P.C.

(57) ABSTRACT

A method and apparatus for detecting an icing condition. The apparatus comprises a piezoelectric material and a vibration detector. The piezoelectric material has a surface proximate to a surface of a vehicle. The piezoelectric material is configured to vibrate. The vibration detector is configured to detect a change in vibrations in the piezoelectric material that indicates a presence of an icing condition on the surface of the piezoelectric material.

18 Claims, 7 Drawing Sheets

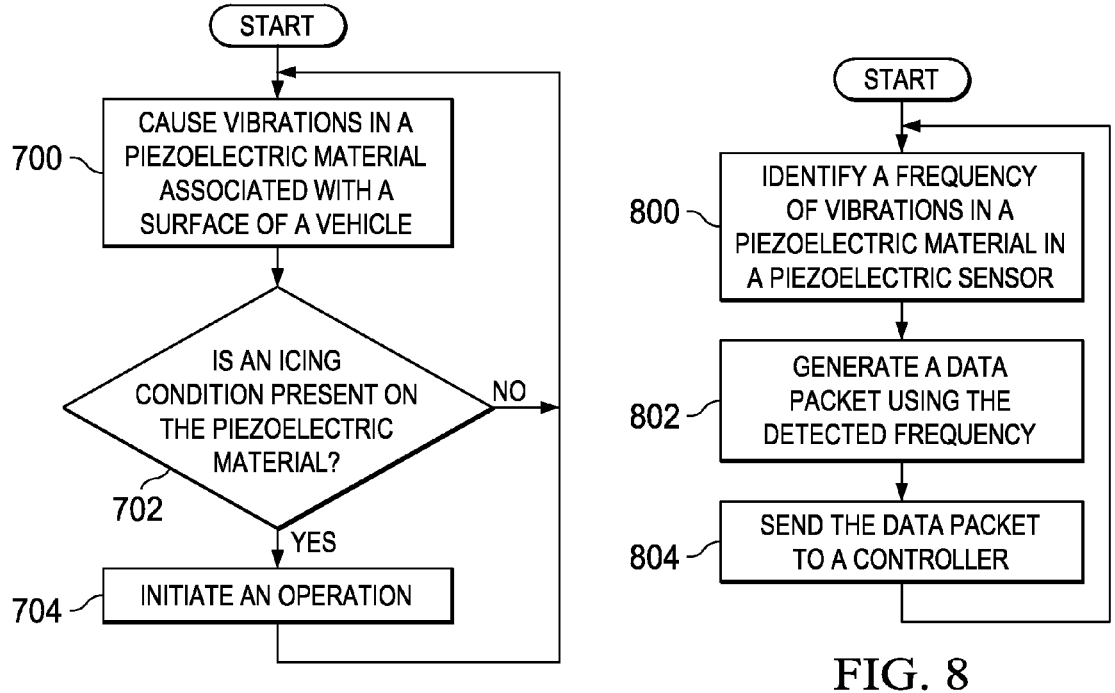
FIG. 7
FIG. 8
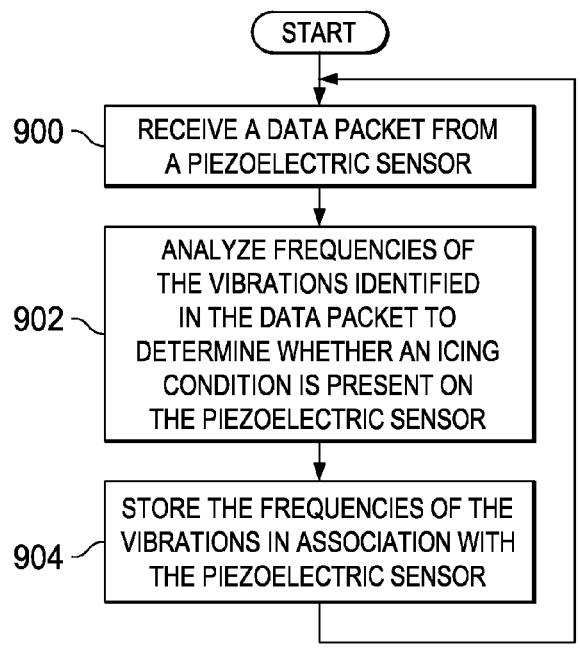
FIG. 9

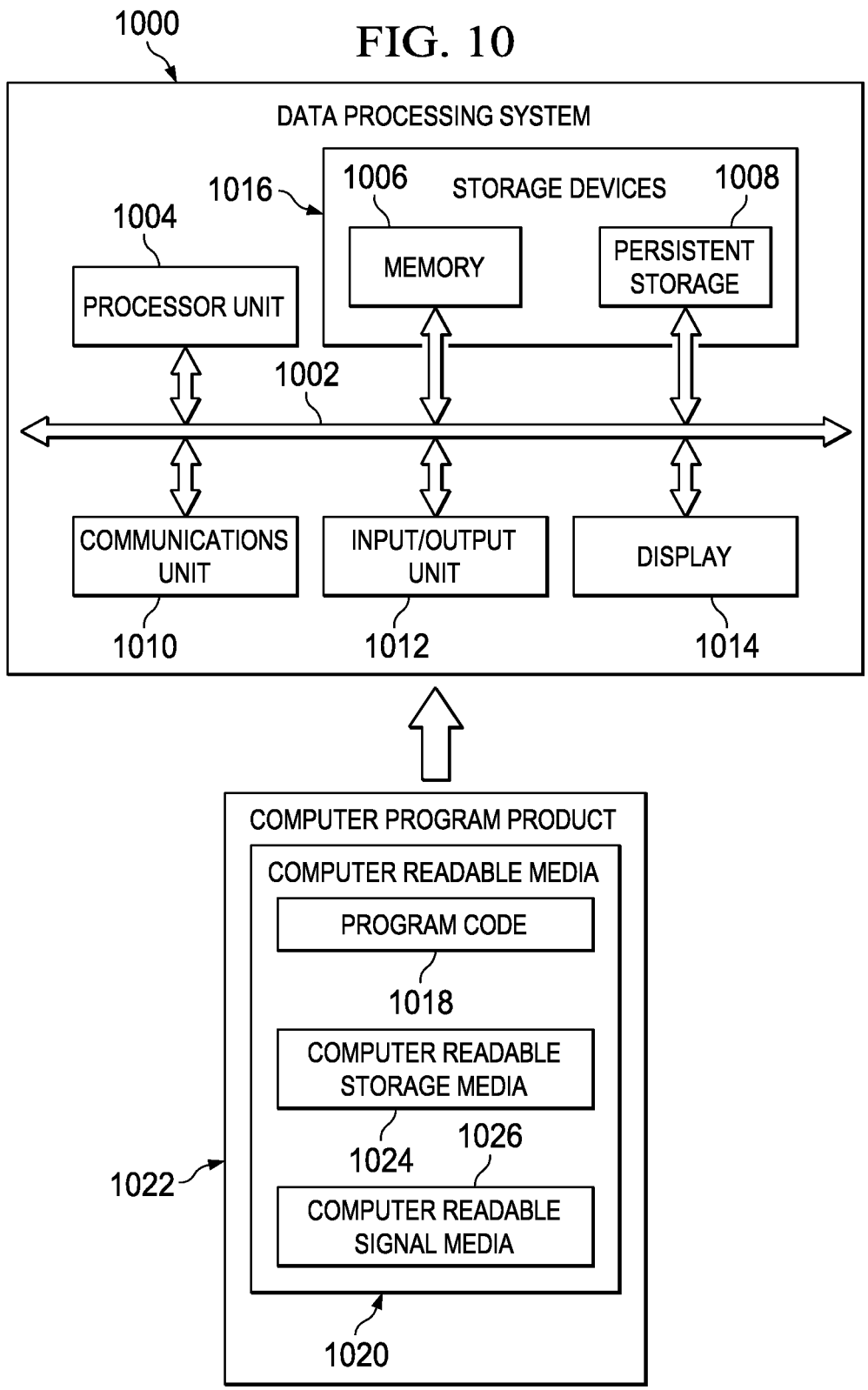

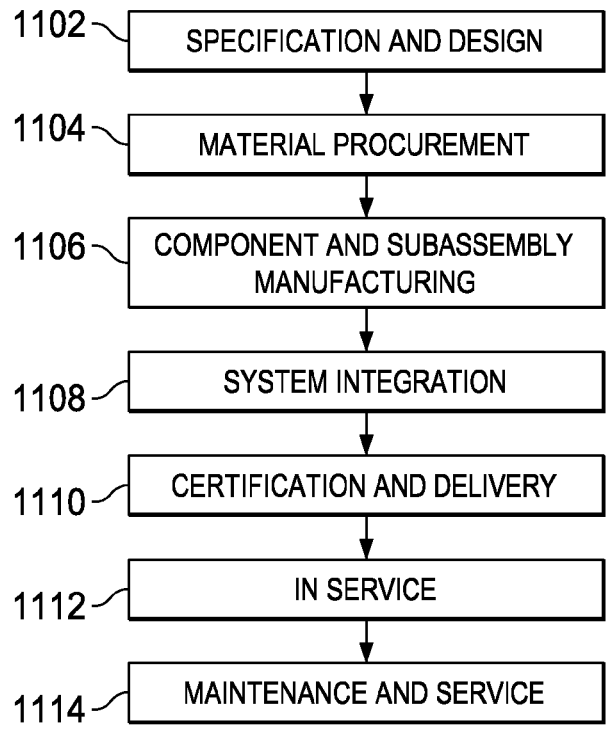
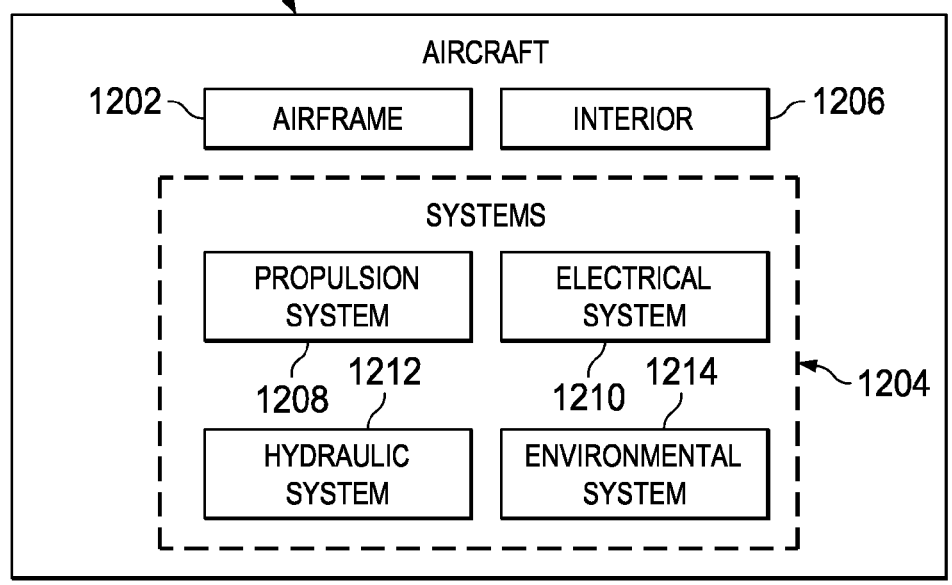

ICING CONDITION DETECTION SYSTEM

BACKGROUND INFORMATION

1. Field

The present disclosure relates generally to aircraft and, in particular, to detecting icing conditions for an aircraft. Still more particularly, the present disclosure relates to a method and apparatus for detecting ice on the surface of an aircraft.

2. Background

In aviation, icing conditions in the atmosphere may lead to the formation of ice on the surfaces of the aircraft. Further, this ice also may occur within the engine. Ice forming on the surfaces of the aircraft, on the inlets of an engine, and other locations is undesirable and potentially unsafe for operating the aircraft.

Icing conditions may occur when drops of supercooled liquid water are present. In these illustrative examples, water is considered to be supercooled when the water is cooled below the stated freezing point for water but is still in a liquid form. Icing conditions may be characterized by the size of the drops, the liquid water content, the air temperature, and other suitable parameters. These parameters may affect the rate and extent at which ice forms on an aircraft.

When icing occurs, the aircraft does not operate as desired. For example, ice on the wing of an aircraft will cause the aircraft to stall at a lower angle of attack and have an increased level of drag.

Aircraft may have mechanisms to prevent icing, remove ice, or some combination thereof to handle these icing conditions. For example, aircraft may include icing detection, prevention, and removal systems. Ice may be removed using deicing fluid, infrared heating, and other suitable mechanisms.

With respect to detecting ice on the surface of an aircraft, ice detection systems that are currently available may not detect formation of ice on the surface of an aircraft as accurately as desired. With currently used ice detection systems, false indications of ice may occur.

For example, one ice detection system detects moisture and temperature. If moisture is present in the environment around the aircraft and if the temperature is low enough, then the ice detection system indicates that ice is present on the surface of the aircraft. However, in some cases, ice may not actually be present on the surface of that aircraft. Depending on the conditions in the environment, moisture may not form ice until temperatures that are lower than the temperatures used as a threshold to indicate a presence of ice are present. Thus, inaccurate indication of a presence of ice may occur.

Further, both small and large supercooled droplets may accumulate on the surface of the aircraft. The accumulation of each type of supercooled droplet may require different safety considerations. For example, when large supercooled droplets accumulate on the aircraft, those droplets may become a safety concern for the safe flight of the aircraft. With small supercooled droplets, those droplets may accumulate on the forward edges of the aircraft without becoming as much of a safety concern to the flight of the aircraft. Current ice detection systems may not differentiate between small and large supercooled droplets. Thus, inaccurate information about the type and severity of ice may occur.

Therefore, it would be desirable to have a method and apparatus that takes into account at least some of the issues discussed above, as well as other possible issues.

SUMMARY

In one illustrative embodiment, an apparatus comprises a piezoelectric material and a vibration detector. The piezoelectric material has a surface proximate to a surface of a vehicle. The piezoelectric material is configured to vibrate. The vibration detector is configured to detect a change in vibrations in the piezoelectric material that indicates a presence of an icing condition on the surface of the piezoelectric material.

In another illustrative embodiment, a method for detecting whether an icing condition is present is provided. Vibrations are caused in a piezoelectric material associated with a surface of a vehicle. A determination is made as to whether the icing condition is present on a surface of the piezoelectric material from the vibrations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a flowchart of a process for detecting an icing condition in accordance with an illustrative embodiment;

FIG. 8 is an illustration of a flowchart of a process for detecting vibrations in a piezoelectric sensor in accordance with an illustrative embodiment;

FIG. 9 is an illustration of a flowchart of a process for determining whether an icing condition is present in accordance with an illustrative embodiment;

FIG. 10 is an illustration of a data processing system in accordance with an illustrative embodiment;

FIG. 11 is an illustration of an aircraft manufacturing and service method in accordance with an illustrative embodiment; and FIG. 12 is an illustration of an aircraft in which an illustrative embodiment may be implemented.

DETAILED DESCRIPTION

The illustrative embodiments recognize and take into account a number of different considerations. For example, the illustrative embodiments recognize and take into account that rather than detecting a presence of moisture and the temperature in the environment around an aircraft, detecting the actual presence of ice or liquid on the surface of the aircraft may increase the accuracy at which ice or liquid is detected on an aircraft.

For example, the illustrative embodiments recognize and take into account that using a sensor with a surface that vibrates may provide a more accurate indication of a presence of an icing condition. For example, the vibrations may change differently when water or ice is present on the surface of the sensor.

Figure 1:
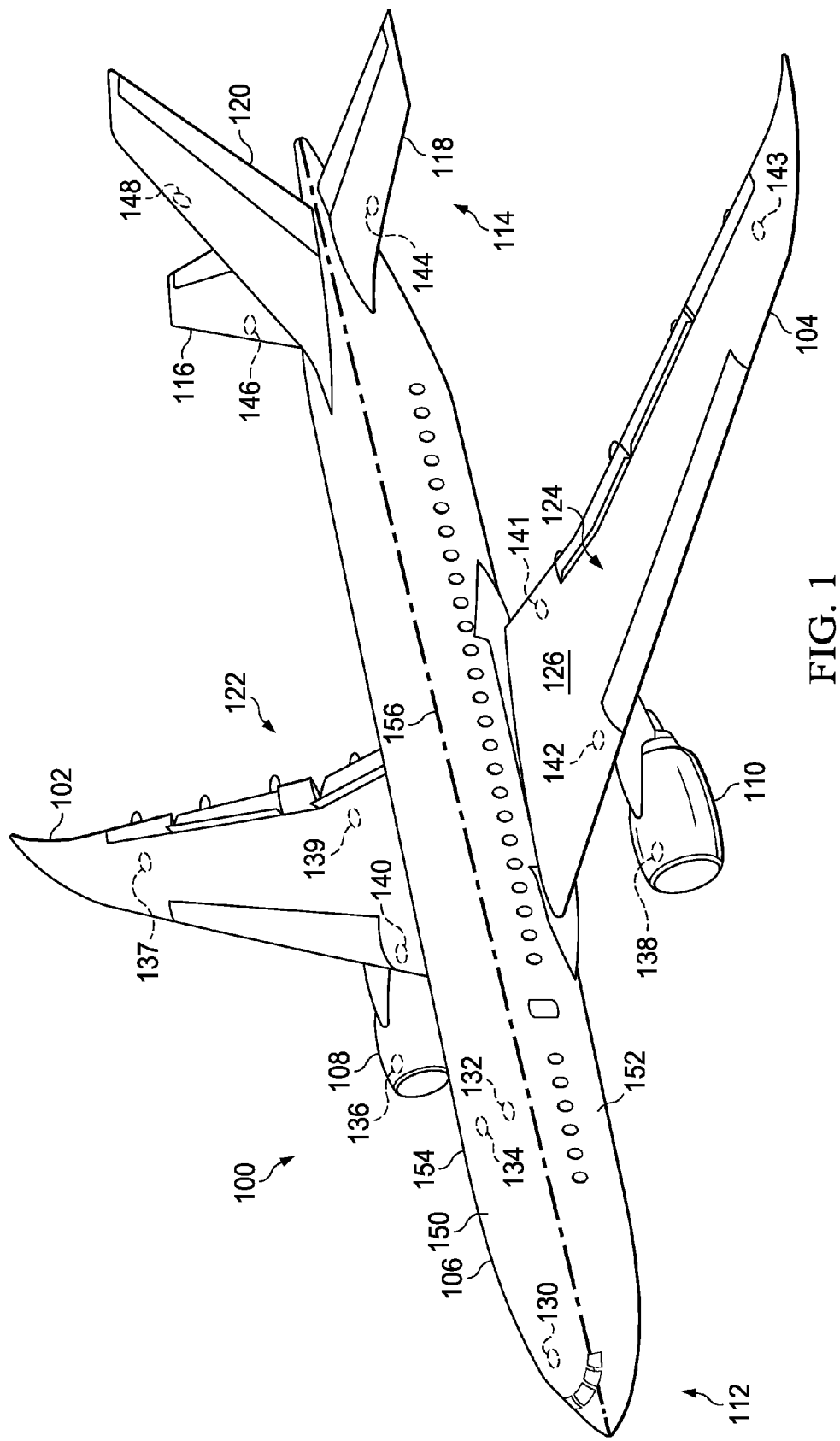
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 also includes engine 108 attached to wing 102 and engine 110 attached to wing 104.

Fuselage 106 has nose section 112 and tail section 114. Nose section 112 is the forward part of aircraft 100, while tail section 114 is the aft part of aircraft 100. Horizontal stabilizer 116, horizontal stabilizer 118, and vertical stabilizer 120 are attached to tail section 114 of fuselage 106.

Aircraft 100 is an example of an aircraft in which icing condition detection system 122 may be implemented in accordance with an illustrative embodiment. In these illustrative examples, icing condition detection system 122 comprises sensors 124 on surface 126 of aircraft 100.

In these illustrative examples, a sensor in sensors 124 may include a piezoelectric material. The piezoelectric material has a surface proximate to surface 126 of aircraft 100 and is configured to vibrate. When ice forms on the surface of the piezoelectric material, the vibrations in the piezoelectric material change. The change in vibrations in the piezoelectric material may be detected to determine whether ice is present on the surface of the piezoelectric material. Additionally, an amount of ice that is built up on the surface of the piezoelectric material also may be identified through the changes in the vibrations of the piezoelectric material over time.

In these illustrative examples, sensors 124 in icing condition detection system 122 may be located in different locations on surface 126 of aircraft 100. As depicted, sensors 124 comprise sensors 130, 132, 134, 136, 137, 138, 139, 140, 141, 142, 143, 144, 146, and 148.

In these illustrative examples, sensors 130, 132, and 134 are located on fuselage 106 of aircraft 100. In this illustrative example, sensor 130 is located on top side 150 of fuselage 106. Sensor 132 is located on side 152 of fuselage 106, while sensor 134 is located on side 154 of fuselage 106. Side 152 and side 154 are opposite of each other on fuselage 106. In this illustrative example, sensor 134 is shown in phantom on side 154 of fuselage 106.

In these illustrative examples, sensors 130, 132, and 134 are located at or above horizontal center line 156 in fuselage 106. Due to the relative position of these sensors, sensors 130, 132, and 134 may be in locations that avoid or reduce exposure to runway debris when aircraft 100 taxis on a runway.

Sensor 136 and sensor 138 are located on the engine housings of engine 108 and engine 110, respectively. Sensors 137, 139, and 140 are located on wing 102, while sensors 141, 142, and 143 are located on wing 104. Sensor 146 is located on horizontal stabilizer 116, and sensor 144 is located on horizontal stabilizer 118. Sensor 148 is located on vertical stabilizer 120.

The illustration of sensors 124 is not meant to imply physical or architectural limitations to the manner in which sensors may be located on aircraft 100 or other aircraft. In these illustrative examples, although 14 sensors are illustrated for sensors 124, other numbers of sensors may be implemented.

For example, only a single sensor may be present in icing condition detection system 122 instead of a number of sensors 124. As used herein, a "number of" when used with reference to items means one or more items. In other words, number of sensors 124 is one or more sensors.

The distribution of sensors 124 on surface 126 of aircraft 100 may allow icing condition detection system 122 to detect different types of icing distribution on portions of surface 126 of aircraft 100. For example, icing conditions on wing 102 of aircraft 100 may be different at different portions of wing 102. As an example, droplets of ice may accumulate more densely at sensor 137 than at sensor 140. As a result, icing condition detection system 122 may be used to determine whether a concern is present for the safe flight of aircraft 100, depending on the distribution of ice on wing 102 or other portions of aircraft 100.

Icing condition detection system 122 also may detect icing conditions before ice forms. For example, icing condition detection system 122 may detect water droplets in conditions where the water droplets may form ice. In other words, the icing condition may be at least one of ice on the surface and water droplets on the surface in conditions that cause water droplets to form ice.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

Figure 2:
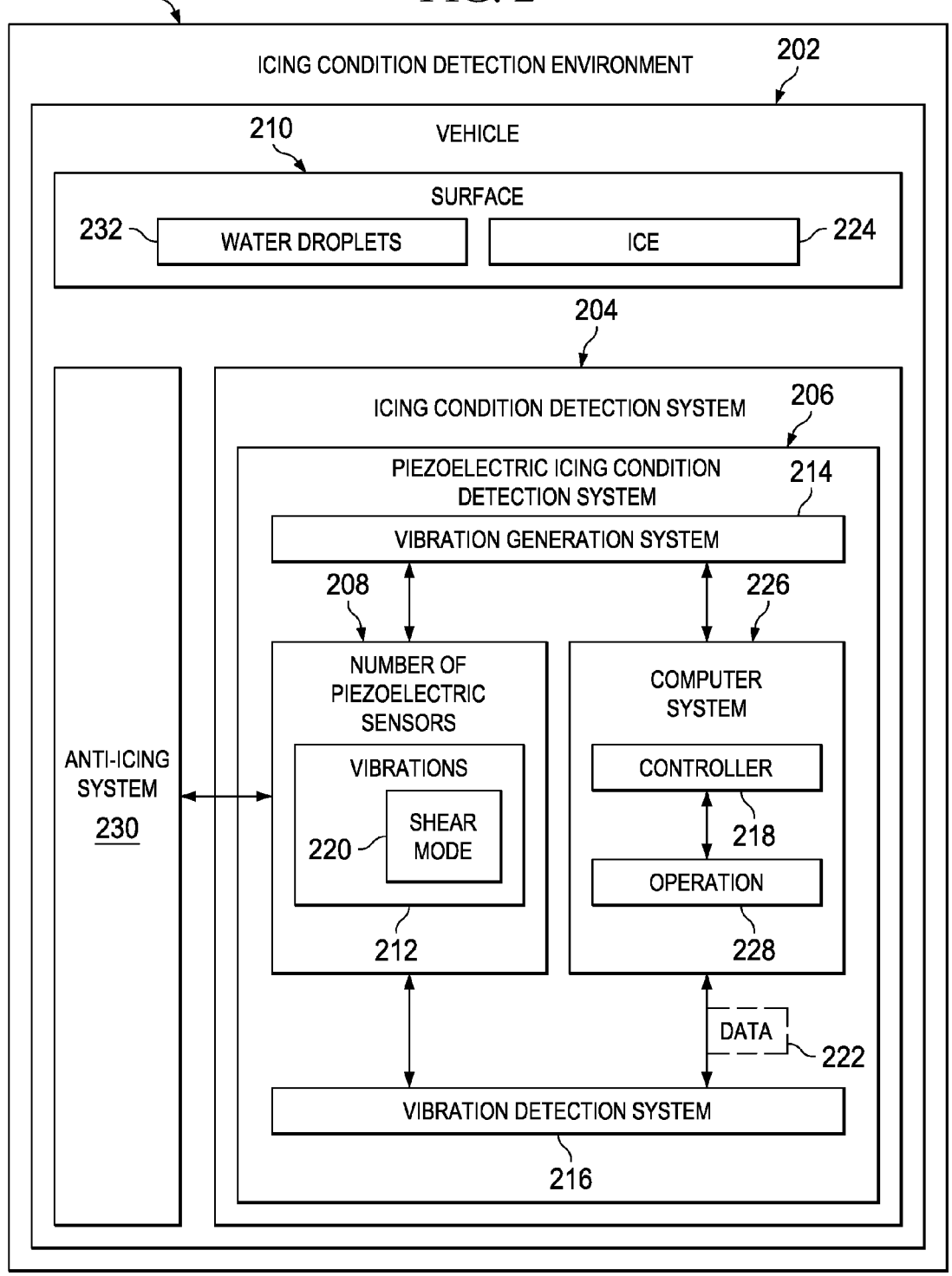
FIG. 2 is an illustration of a block diagram of an icing condition detection environment in accordance with an illustrative embodiment.

Turning next to FIG. 2, an illustration of a block diagram of an ice detection environment is depicted in accordance with an illustrative embodiment. Icing condition detection environment 200 is an environment in which ice detection may be performed for vehicle 202. In this illustrative example, vehicle 202 may be aircraft 100 in FIG. 1.

Icing condition detection system 204 may be associated with vehicle 202. When one component is "associated" with another component, the association is a physical association in these depicted examples. For example, a first component, icing condition detection system 204, may be considered to be associated with a second component, vehicle 202, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, icing condition detection system 204 takes the form of piezoelectric icing condition detection system 206. Piezoelectric icing condition detection system 206 includes number of piezoelectric sensors 208. As depicted, number of piezoelectric sensors 208 may be located substantially flush or planar to surface 210 of vehicle 202.

In these illustrative examples, number of piezoelectric sensors 208 generates vibrations 212. Vibrations 212 may be used to determine whether ice 224 is present on surface 210 of vehicle 202.

Piezoelectric icing condition detection system 206 also includes vibration generation system 214, vibration detection system 216, and controller 218. Vibration generation system 214 is hardware configured to generate electrical signals that cause number of piezoelectric sensors 208 to generate vibrations 212.

In these illustrative examples, vibrations 212 have shear mode 220. Vibrations 212 having shear mode 220 involve waves that have motion in a direction that is substantially perpendicular to the direction in which the waves propagate.

Vibration detection system 216 is configured to detect vibrations 212. In particular, vibration detection system 216 may detect the frequency of vibrations 212. Vibration detection system 216 is configured to generate data 222. In these illustrative examples, data 222 may be, for example, without limitation, at least one of a frequency distribution, amplitude, relative phase of vibrations in vibrations 212 with respect to other vibrations in vibrations 212, or some other suitable parameter. Also, multiple vibrations with different frequencies may be present and detected from data 222.

Data 222 is used by controller 218 to determine whether ice 224 is present on surface 210 of vehicle 202. Controller 218 may be implemented in hardware, software, or a combination of the two. In these illustrative examples, controller 218 may be implemented within computer system 226. Computer system 226 is one or more computers. When more than one computer is present in computer system 226, those computers may be in communication with each other using a communications medium such as a network.

When software is used, the operations performed by the components may be implemented in program code configured to be run on a processor unit. When hardware is employed, the hardware may include circuits that operate to perform the operations in the components.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 218 analyzes data 222 to determine whether vibrations 212 at any of number of piezoelectric sensors 208 indicate a presence of ice 224 on surface 210 of vehicle 202. Further, controller 218 also may determine a mass of ice 224 detected on surface 210 of vehicle 202.

In response to detecting a presence of ice 224 on surface 210 of vehicle 202, operation 228 may be performed by controller 218. Operation 228 may take a number of different forms. For example, operation 228 may be at least one of generating an alert indicating a presence of ice 224, initiating operation of anti-icing system 230, and other suitable operations.

In these illustrative examples, the alert may include a visual indicator, a sound, or other suitable alert that may be presented to the operator of vehicle 202. In some cases, the alert also may be sent to an operator or computer system in a location remote to vehicle 202.

Anti-icing system 230 is configured to remove ice 224 from surface 210 of vehicle 202. Additionally, anti-icing system 230 also may be configured to remove ice from number of piezoelectric sensors 208. Anti-icing system 230 may take a number of different forms. For example, without limitation, anti-icing system 230 may be selected from at least one of an infrared heater, an electrical resistive heater, a de-icer boot, and other suitable types of anti-icing devices.

Further, icing condition detection system 204 may also detect conditions on surface 210 where ice 224 may form before ice 224 forms on surface 210 of vehicle 202. For example, number of piezoelectric sensors 208 in icing condition detection system 204 may detect water droplets 232 that reach number of piezoelectric sensors 208 on surface 210 of vehicle 202 in conditions where ice 224 may form. The detection of ice 224, water droplets 232, or both ice 224 and water droplets 232 may be used to identify one or more types of icing conditions that may be present. In other words, an icing condition may be present when ice 224 has formed on surface 210, when water droplets 232 are detected on surface 210 when the environmental conditions may cause water droplets 232 to form ice 224, or both.

Figure 3:
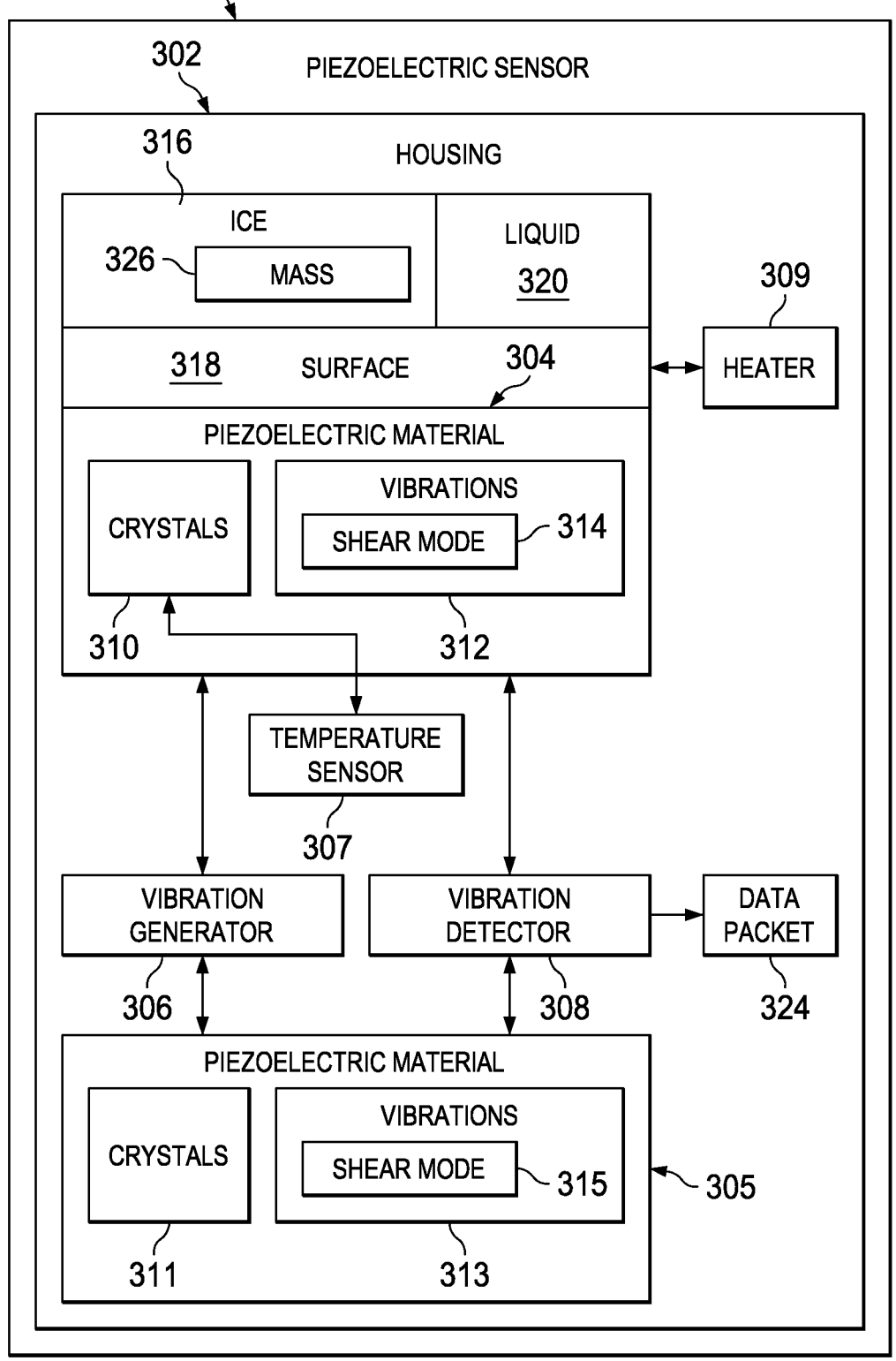
FIG. 3 is an illustration of a block diagram of a piezoelectric sensor in accordance with an illustrative embodiment.

Turning now to FIG. 3, an illustration of a block diagram of a piezoelectric sensor is depicted in accordance with an illustrative embodiment. Piezoelectric sensor 300 is an example of a sensor in number of piezoelectric sensors 208 in FIG. 2.

As depicted, piezoelectric sensor 300 includes housing 302, piezoelectric material 304, piezoelectric material 305, vibration generator 306, temperature sensor 307, vibration detector 308, and heater 309. In these illustrative examples, piezoelectric material 304, piezoelectric material 305, vibration generator 306, temperature sensor 307, vibration detector 308, and heater 309 are associated with housing 302. Temperature sensor 307 may be used to monitor the temperature of piezoelectric material 304.

Housing 302 is a structure configured to be mounted in vehicle 202. In particular, housing 302 may be configured to be mounted substantially flush or planar to surface 210 of vehicle 202. When housing 302 is mounted substantially flush to surface 210 of vehicle 202, housing 302 and the different components associated with housing 302 may not add to the drag on vehicle 202 when vehicle 202 is moving.

Piezoelectric material 304 is a material in which an electrical mechanical interaction is present between the electrical state and the mechanical state. In these illustrative examples, piezoelectric material 304 takes the form of crystals 310. Piezoelectric material 304 is configured to vibrate when an electrical charge is applied to piezoelectric material 304 in these illustrative examples.

Piezoelectric material 305 may take the form of crystals 311. In these illustrative examples, piezoelectric material 305 is selected to be substantially identical to piezoelectric material 304. In other words, piezoelectric material 304 and piezoelectric material 305 may be selected to be the same material and have substantially the same dimensions.

Piezoelectric material 304 and piezoelectric material 305 may be selected from a number of different materials. For example, without limitation, piezoelectric material 304 and piezoelectric material 305 may be selected from one of a piezoelectric crystal, a piezoelectric ceramic, quartz, gallium phosphate, and other suitable materials.

Vibration generator 306 is hardware and also may include software. In this illustrative example, vibration generator 306 is an example of a device that may be implemented in vibration generation system 214 in FIG. 2.

As depicted, vibration generator 306 is electrically connected to piezoelectric material 304 and piezoelectric material 305. Vibration generator 306 is configured to cause vibrations 312 in piezoelectric material 304 and vibrations 313 in piezoelectric material 305.

In this illustrative example, vibrations 312 have shear mode 314. Additionally, vibrations 313 may have shear mode 315. Vibrations 312 having shear mode 314 and vibrations 313 having shear mode 315 involve waves that have motion in a direction that is substantially perpendicular to the direction in which the waves propagate.

In these illustrative examples, piezoelectric material 304 and piezoelectric material 305 may react differently to different types of conditions. For example, piezoelectric material 304 and piezoelectric material 305 may be less disturbed by liquid droplets than by supercooled droplets. In other words, vibrations 212 having shear mode 314 and vibrations 313 having shear mode 315 may not occur for liquid droplets in the same manner as with supercooled droplets. As a result, piezoelectric sensor 300 may be able to distinguish between liquid loading and ice loading on the surface of the piezoelectric material.

As depicted, the presence of the two types of water droplets may indicate different types of icing conditions. For example, a first type of icing condition and a second type of icing condition may be caused by drops of water of different sizes. Although the altitude, temperature, and liquid water content ranges may be the same, one difference between the first and second types of icing conditions is the drop size.

In these illustrative examples, these icing conditions may occur at different altitudes and temperatures that cause the formation of ice on vehicle 202 when vehicle 202 takes the form of aircraft 100. For example, icing conditions may be present at an altitude from about sea level to about 30,000 feet when the temperature is from about −40 degrees Celsius to about zero degrees Celsius. Of course, other altitudes and temperatures may be present at which ice may be formed from water that contacts surface 126 of aircraft 100. Icing conditions also may be present when the liquid water content in the drops is from about 0.4 to about 2.8 grams/cubic meter at the altitude and temperature range described above.

In these illustrative examples, the first type of icing condition may be present when the size of the drops is from about 0.00465 millimeters in diameter to about 0.111 millimeters in diameter. Drops with these sizes may be referred to as normal drops. The second type of icing condition may be present when the size of the drops includes drops that have a diameter greater than about 0.111 millimeters. Drops having a size greater than about 0.111 millimeters may be referred to as large drops and, in particular, may be called supercooled large drops under selected altitude, temperature, and liquid water content conditions. Water is considered to be supercooled when the water is cooled below the stated freezing point for water but is still in a liquid form.

As depicted, piezoelectric sensor 300 may be configured to detect ice formed by drops of water in a first number of sizes. Also, piezoelectric sensor 300 may be configured to detect ice formed by drops of water having a second number of sizes. In these illustrative examples, the first number of sizes is smaller than the second number of sizes. The different conditions may be detected based on placement of piezoelectric sensor 300 on aircraft 100 in FIG. 1.

For example, the first number of sizes may be from about 0.00465 millimeters in diameter to about 0.111 millimeters in diameter. The second number of sizes may be from about 0.112 millimeters to about 2.2 millimeters in diameter.

The second number of sizes of the drops of water may be drops of water that are considered to be drops of supercooled water. Thus, these drops of supercooled water may be supercooled large drops.

Vibrations 312 may change when ice 316 is on surface 318 of piezoelectric material 304. In these depicted examples, surface 318 is exposed to the external environment. In this illustrative example, changes in vibrations 312 are different with ice 316 on surface 318 as opposed to when ice 316 is absent from surface 318. Further, changes in vibrations 312 are different when liquid 320 is present on surface 318. In other words, the changes in vibrations 312 may be used to distinguish between a presence of liquid 320 or ice 316 on surface 318 of piezoelectric material 304.

In these illustrative examples, vibrations 313 do not change in response to ice 316 being present. Piezoelectric material 305 is not exposed to the exterior of the aircraft in a manner that allows for the formation of ice 316 on piezoelectric material 305. However, piezoelectric material 305 may be exposed to the same temperatures as piezoelectric material 304.

This exposure to temperatures may be such that changes in temperature result in vibrations 312 in piezoelectric material 304 and vibrations 313 in piezoelectric material 305 being substantially the same or identical when ice 316 or other fluid is not present on surface 318 of piezoelectric material 304. In other words, vibrations 313 in piezoelectric material 305 are reference vibrations for vibrations 312 in piezoelectric material 304.

Vibration detector 308 is hardware and may include software. Vibration detector 308 is configured to detect vibrations 312 and generate data packet 324. Data packet 324 is an example of a data packet that may be in data 222 in FIG. 2. Data packet 324 may be used to determine whether ice 316 is present on surface 318 of piezoelectric material 304.

In still other illustrative examples, data packet 324 also may be used to determine mass 326 of ice 316 on surface 318 of piezoelectric material 304. For example, the measurement of the frequency shift in piezoelectric material 304 from a designated baseline frequency for piezoelectric material 304 may be used to determine mass 326 of ice 316 on surface 318 of piezoelectric material 304.

In these illustrative examples, temperature sensor 307 is a hardware device configured to monitor the temperature of crystals 310 in piezoelectric material 304. Temperature sensor 307 may be, for example, without limitation, a thermistor, a pyrometer, or some other suitable type of temperature sensor to monitor the temperature of crystals 310. In other illustrative examples, temperature sensor 307 may be absent. Temperature sensor 307 also may be used to determine whether the temperature is low enough to cause liquid 320, such as water droplets, to form ice 316.

Heater 309 is a hardware device configured to remove ice 316 from surface 318 of piezoelectric material 304. Heater 309 is an example of a device that may be implemented in anti-icing system 230 in FIG. 2. As depicted, heater 309 may be implemented using an electrical resistive heater, a flash heater, or some other suitable type of device.

Removing ice 316 from surface 318 of piezoelectric material 304 allows the detection of future formation of ice 316 on surface 318 of piezoelectric material 304. The removal of ice 316 from surface 318 of piezoelectric material 304 may occur after ice 316 has been removed from other portions of surface 210 of vehicle 202.

Figure 4:
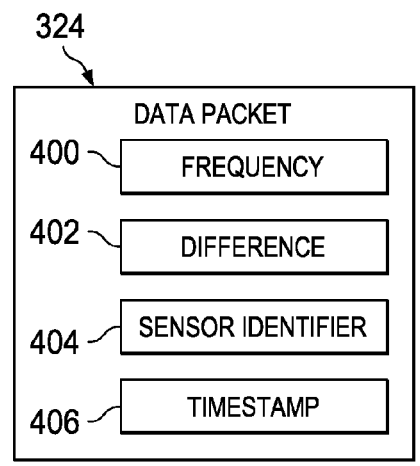
FIG. 4 is an illustration of a block diagram of a data packet that may be generated by a piezoelectric sensor in accordance with an illustrative embodiment.

Turning now to FIG. 4, an illustration of a block diagram of a data packet that may be generated by a piezoelectric sensor is depicted in accordance with an illustrative embodiment. In this figure, examples of data that may be included in data packet 324 and generated by vibration detector 308 are shown. As depicted, data packet 324 includes frequency 400, difference 402, sensor identifier 404, and timestamp 406.

Frequency 400 is the frequency of vibrations 312 in piezoelectric material 304. Difference 402 identifies the difference between frequency 400 of vibration 312 in piezoelectric material 304 and the frequency of vibrations 313 in piezoelectric material 305.

Sensor identifier 404 is a unique identifier identifying the piezoelectric sensor generating data packet 324. Timestamp 406 identifies the time when the data in data packet 324 was generated.

The illustration of icing condition detection environment 200 in FIG. 2 and the different components in FIG. 3 and FIG. 4 are not meant to imply physical or architectural limitations to the manner in which an illustrative embodiment may be implemented.

For example, in some illustrative examples, piezoelectric material 305 may be omitted. The expected frequency of vibrations 312 when ice 316 is present on surface 318 of piezoelectric material 304 may be stored in a database. The database may provide expected frequencies for the formation of ice 316 at different temperatures and altitudes.

In another illustrative example, data packet 324 may include other types of information in addition to or in place of the information illustrated in FIG. 4. For example, in some illustrative examples, data packet 324 also may include an identification of a temperature. The temperature may be used to determine whether frequency 400 indicates a presence of ice when difference 402 is not included in data packet 324.

Figure 5:
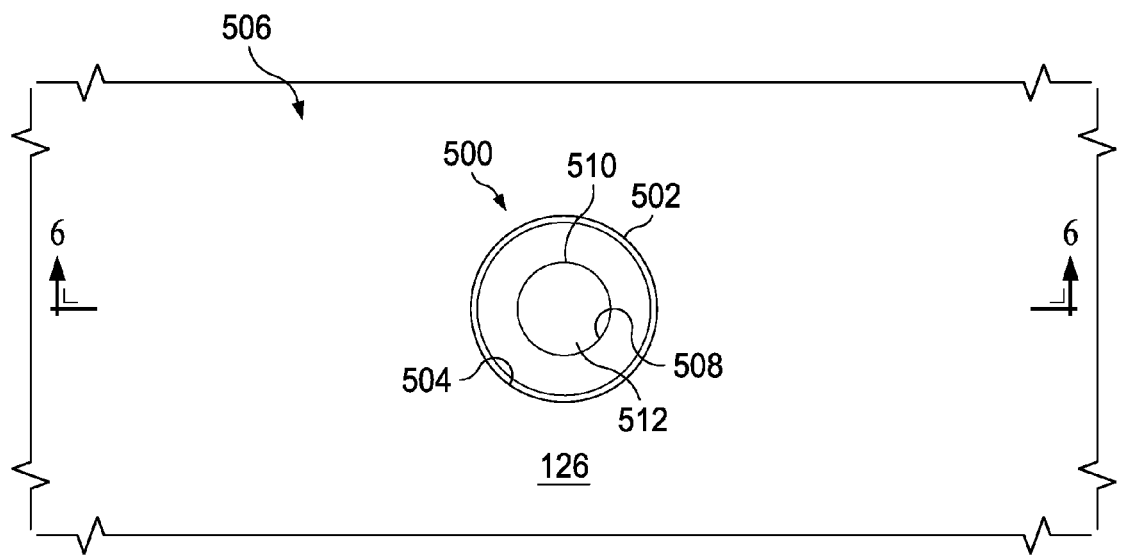
FIG. 5 is an illustration of a piezoelectric sensor in accordance with an illustrative embodiment.

Turning now to FIG. 5, an illustration of a piezoelectric sensor is depicted in accordance with an illustrative embodiment. Piezoelectric sensor 500 is an example of a physical implementation of piezoelectric sensor 300 shown in block form in FIG. 3.

Piezoelectric sensor 500 includes housing 502. Housing 502 is designed to fit within opening 504 in surface 126 of fuselage 106 in FIG. 1. Housing 502 is configured to have a shape that is substantially flush to surface 126 when placed into opening 504. Further, the shape of housing 502 is such that housing 502 substantially conforms to curvature 506 in surface 126.

Additionally, housing 502 also has opening 508. Opening 508 has a substantially circular shape in this illustrative example. Of course, opening 508 may have any shape desired depending on the particular implementation. Opening 508 exposes surface 510 of piezoelectric material 512 located in housing 502 of piezoelectric sensor 500.

Figure 6:
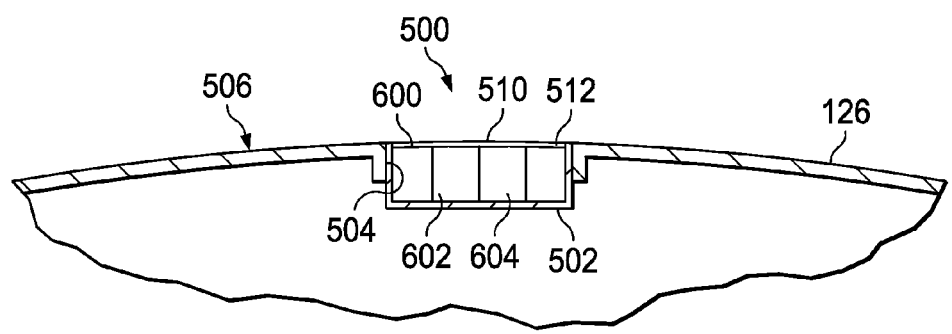
FIG. 6 is an illustration of a cross-sectional view of a piezoelectric sensor installed in an aircraft fuselage in accordance with an illustrative embodiment.

Turning now to FIG. 6, an illustration of a cross-sectional view of a piezoelectric sensor installed in an aircraft fuselage is depicted in accordance with an illustrative embodiment. In this illustrative example, a cross-sectional view of piezoelectric sensor 500 is seen taken along lines 6-6 in FIG. 5.

In this view, housing 502 is depicted such that at least one of surface 600 of housing 502 and surface 510 of piezoelectric material 512 is substantially flush to surface 126. In particular, surface 600 of housing 502 and surface 510 of piezoelectric material 512 may have curvature 506 such that surface 600 of housing 502 and surface 510 of piezoelectric material 512 substantially conform to curvature 506 of surface 126 of aircraft 100.

In this view, vibration generator 602 and vibration detector 604 also are seen within housing 502. These components are implemented using integrated circuits in these illustrative examples.

The different components shown in FIG. 1 and FIGS. 4-6 may be combined with components in FIGS. 2-3, used with components in FIGS. 2-3, or a combination of the two. Additionally, some of the components in FIG. 1 and FIGS. 4-6 may be illustrative examples of how components shown in block form in FIGS. 2-3 can be implemented as physical structures.

With reference now to FIG. 7, an illustration of a flowchart of a process for detecting an icing condition is depicted in accordance with an illustrative embodiment. The process illustrated in FIG. 7 may be implemented in icing condition detection environment 200 in FIG. 2. In particular, the different operations may be implemented within icing condition detection system 204.

The process begins by causing vibrations in a piezoelectric material associated with a surface of a vehicle (operation 700). In this illustrative example, the vibrations may be vibrations in a shear mode. The process then determines whether an icing condition is present on the piezoelectric material from the vibrations (operation 702). The icing condition may be ice, water droplets that may form ice, or both ice and water droplets in these illustrative examples.

If it is determined that an icing condition is present on the piezoelectric material, an operation is initiated (operation 704) with the process returning to operation 700. This operation may include, for example, without limitation, generating an alert, initiating operation of an anti-icing system, and other suitable operations. The alert may be, for example, a visual alert, an audio alert, or both a visual alert and an audio alert that are presented to an operator of the vehicle.

In other illustrative examples, operation 704 may be the initiation of an anti-icing system. With the initiation of the anti-icing system, ice that has accumulated on the surface of the piezoelectric material may be removed. With reference again to operation 702, if it is determined that an icing condition is absent, the process returns to operation 700 as described above.

Turning now to FIG. 8, an illustration of a flowchart of a process for detecting vibrations in a piezoelectric sensor is depicted in accordance with an illustrative embodiment. The process illustrated in FIG. 8 may be implemented in a piezoelectric sensor in number of piezoelectric sensors 208 in icing condition detection system 204 in FIG. 2. In particular, this process may be implemented in vibration detector 308 in piezoelectric sensor 300 in FIG. 3.

The process begins by identifying a frequency of vibrations in a piezoelectric material in a piezoelectric sensor (operation 800). In operation 800, the piezoelectric material is a piezoelectric material that is exposed to the environment around the vehicle. In other words, the exposure is such that if ice forms on the surface of the vehicle, ice may also form on the piezoelectric material.

Next, a data packet is generated using the detected frequency (operation 802). The data packet may also include an identification of the piezoelectric sensor, a timestamp, and other suitable information. For example, a frequency of another piezoelectric material in the piezoelectric sensor that is not exposed to the environment may also be identified and included in the data packet. Additionally, the data packet may also include multiple frequencies, amplitudes, and phases for the piezoelectric material in the piezoelectric sensor.

The process then sends the data packet to a controller (operation 804). The process then returns to operation 800 as described above.

Turning now to FIG. 9, an illustration of a flowchart of a process for determining whether an icing condition is present is depicted in accordance with an illustrative embodiment. The process illustrated in FIG. 9 is an example of an implementation for operation 702 in FIG. 7. The different operations in this flowchart may be performed by controller 218 in icing condition detection system 204 in FIG. 2.

The process begins by receiving a data packet from a piezoelectric sensor (operation 900). The piezoelectric sensor sending the data packet is identified from a sensor identifier in the data packet. Frequencies of vibrations identified in the data packet are analyzed to determine whether an icing condition is present on the piezoelectric sensor (operation 902). In operation 902, the analysis may determine how much ice or water droplets are present in addition to whether an icing condition is present.

Further, in these illustrative examples, the frequencies may be analyzed in a manner that distinguishes between a presence of ice and a liquid such as water. The formation of ice on the surface of the piezoelectric sensor may result in a greater reduction in frequency than when a liquid is present on the surface of the piezoelectric sensor.

Next, the process stores the frequencies of the vibrations in association with the piezoelectric sensor (operation 904) with the process returning to operation 900 as described above. In this manner, a history of frequencies may be collected for use in determining whether ice is present on the piezoelectric sensor when the analysis is performed in operation 902.

Further, this history of frequencies may be used to determine whether different types of icing conditions are present on the surface of the piezoelectric sensor. For example, the icing rate, the presence of measurable individual frequency changes, and other factors may indicate the presence of supercooled large drop icing conditions on the surface of the piezoelectric sensor.

Additionally, as an operation is initiated in operation 704, such as the anti-icing system, more data is added to the history of frequencies. In other words, as the anti-icing system thaws the ice on the surface of the piezoelectric sensor and the ice cools again, the measured frequency changes may help determine which type of icing condition is present on the surface of the piezoelectric sensor. For example, with supercooled large drop icing conditions, the frequency changes will be much larger than the frequency changes during normal icing conditions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 10, an illustration of a data processing system is depicted in accordance with an illustrative embodiment. Data processing system 1000 may be used to implement computer system 226 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communication framework may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026. In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. For example, number of piezoelectric sensors 208 in icing condition detection system 204 may be installed in aircraft 1200 during system integration 1108. These sensors also may be installed during maintenance and service 1114 as an upgrade or refurbishment of aircraft 1200.

Thus, the illustrative embodiments provide a method and apparatus for detecting a presence of one or more icing conditions on an aircraft as well as other vehicles. In these illustrative examples, the actual presence of an icing condition may be detected as well as the mass of the ice or water droplets that form on the piezoelectric sensors. With the use of piezoelectric sensors, false indications of ice on the surface of an aircraft may be reduced. Further, the illustrative embodiments may detect different types of icing conditions present on the surface of the aircraft or other vehicles.

The description of the different illustrative embodiments has been presented for purposes of illustration and description, and is not intended to be exhaustive or limited to the embodiments in the form disclosed. Many modifications and variations will be apparent to those of ordinary skill in the art. For example, although the illustrative examples for an illustrative embodiment are described with respect to an aircraft, an illustrative embodiment may be applied to other vehicles other than aircraft. Other vehicles may include, for example, without limitation, a submarine, a personnel carrier, a tank, a train, an automobile, a bus, a spacecraft, a surface ship, and other suitable vehicles.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a first piezoelectric material having a first surface proximate to a surface of a vehicle and configured to vibrate in a shear mode wherein the first piezoelectric material vibrates in a direction perpendicular to a direction in which waves generated by the first piezoelectric material propagate;
   a second piezoelectric material having a second surface remote from the surface of the vehicle and configured to vibrate in the shear mode;
   a vibration detector configured to detect a difference in a frequency of vibrations in the first piezoelectric material compared to a frequency of vibrations in the second piezoelectric material to detect a presence of an icing condition on the first surface of the first piezoelectric material; and
   an electrical resistive heater configured to remove ice from the surface of the vehicle.

2. The apparatus of claim 1, wherein the first piezoelectric material and the vibration detector form a piezoelectric sensor.

3. The apparatus of claim 1 further comprising:
   a vibration generator configured to cause the first piezoelectric material to vibrate.

4. The apparatus of claim 1, wherein the first piezoelectric material and the vibration detector are associated with a housing installed in the vehicle such that the first surface of the first piezoelectric material is flush with the surface of the vehicle.

5. The apparatus of claim 1, wherein in being configured to detect the difference in the frequency of vibrations in the first piezoelectric material that indicates the presence of the icing condition on the surface of the first piezoelectric material, the vibration detector is configured to detect a number of icing conditions on the surface of the first piezoelectric material based on a change in the vibrations.

6. The apparatus of claim 1 further comprising:
   an anti-icing system configured to remove ice from the first surface of the first piezoelectric material.

7. The apparatus of claim 1, wherein:
   the first surface of the first piezoelectric material is exposed to an environment;

the second surface of the second piezoelectric material is not exposed to the environment; and the second piezoelectric material is identical to the first piezoelectric material.

8. The apparatus of claim 7, wherein the first piezoelectric material and the second piezoelectric material are exposed to a same temperature, wherein changes in the temperature result in vibrations in the first piezoelectric material being the same as the vibrations in the second piezoelectric material when ice or other fluid is not present on the surface of the first piezoelectric material, and wherein the vibration detector is further configured to detect a change in the frequency of vibration of the first piezoelectric material relative to a frequency of vibration of the second piezoelectric material to indicate the presence of the icing condition on the surface of the first piezoelectric material.

9. The apparatus of claim 1, wherein the icing condition is selected from at least one of ice on the surface of the vehicle and water droplets on the surface of the vehicle in conditions that cause the water droplets to form the ice.

10. An apparatus comprising:
a first piezoelectric material having a first surface proximate to a surface of a vehicle and configured to vibrate in a shear mode wherein the piezoelectric material vibrates in a direction perpendicular to a direction in which waves generated by the first piezoelectric material propagate;
a second piezoelectric material having a second surface remote from the surface of the vehicle and configured to vibrate in the shear mode;
a vibration detector configured to detect a difference in vibrations in a frequency of vibration of the first piezoelectric material compared to a frequency of vibration of the second piezoelectric material to indicate a presence of ice on the first surface of the first piezoelectric material; and
an electrical resistive heater configured to remove the ice from the surface of the vehicle.

11. An apparatus comprising:
a first piezoelectric material having a first surface proximate to a surface of a vehicle such that the first surface is exposed to an environment, wherein the first piezoelectric material is configured to vibrate in a shear mode wherein the first piezoelectric material vibrates in a direction perpendicular to a direction in which waves generated by the first piezoelectric material propagate;
a second piezoelectric material having a second surface remote from the surface of the vehicle, wherein the second piezoelectric material is configured to vibrate in the shear mode at a second frequency;
a vibration generator configured to detect a difference in the first frequency and the second frequency to indicate a presence of an icing condition on the first surface of the first piezoelectric material; and
an electrical resistive heater configured to remove ice from the surface of the vehicle.

12. The apparatus of claim 11, wherein the first piezoelectric material and the second piezoelectric material are exposed to a same temperature.

13. The apparatus of claim 11, wherein the vibrations in the second piezoelectric material define reference vibrations.

14. The apparatus of claim 11, wherein the icing condition is selected from at least one of ice on the surface of the vehicle and water droplets on the surface of the vehicle in conditions that cause the water droplets to form the ice.

15. The apparatus of claim 14, wherein the icing condition comprises the ice on the surface of the vehicle and the vibration generator is further configured to determine an amount of the ice developed on the surface of the vehicle.

16. The apparatus of claim 11, wherein the first piezoelectric material is the same as the second piezoelectric material.

17. The apparatus of claim 11, wherein the first piezoelectric material and the second piezoelectric material are associated with a housing installed on the vehicle such that the first surface of the first piezoelectric material is flush with a surface of the vehicle and the second surface of the second piezoelectric material is recessed within the housing.

18. The apparatus of claim 11, wherein the first piezoelectric material vibrates in the shear mode such that the first piezoelectric material vibrates in a direction perpendicular to a direction in which waves generated by the first piezoelectric material propagate.

* * * * *